(12) United States Patent
Conway

(10) Patent No.: US 8,260,657 B1
(45) Date of Patent: *Sep. 4, 2012

(54) DYNAMIC PRICING OF ELECTRONIC CONTENT

(75) Inventor: David P. Conway, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,910

(22) Filed: Sep. 30, 2011

Related U.S. Application Data

(63) Continuation of application No. 12/973,121, filed on Dec. 20, 2010.

(51) Int. Cl.
*G06Q 10/00* (2012.01)
*G06F 21/00* (2006.01)
*G06F 17/00* (2006.01)
*H04N 7/167* (2011.01)

(52) U.S. Cl. ...... 705/7.35; 705/1.1; 705/7.29; 705/7.31; 705/7.32; 705/7.37; 705/28; 705/52; 705/400; 380/231

(58) Field of Classification Search .......... 705/1.1, 705/7.29, 7.31, 7.32, 7.35, 7.37, 28, 52, 400; 380/231
See application file for complete search history.

(56) References Cited

U.S. PATENT DOCUMENTS

| | | | | |
|---|---|---|---|---|
| 5,819,092 A * | 10/1998 | Ferguson et al. | ............ | 717/113 |
| 5,825,883 A * | 10/1998 | Archibald et al. | ............ | 705/53 |
| 6,014,661 A * | 1/2000 | Ahlberg et al. | ............ | 1/1 |
| 6,044,471 A | 3/2000 | Colvin | | |
| 6,073,112 A * | 6/2000 | Geerlings | ............ | 705/14.53 |
| 6,307,958 B1 * | 10/2001 | Deaton et al. | ............ | 382/139 |
| 6,487,541 B1 * | 11/2002 | Aggarwal et al. | ............ | 705/7.29 |
| 6,587,837 B1 * | 7/2003 | Spagna et al. | ............ | 705/52 |
| 6,785,825 B2 | 8/2004 | Colvin | | |
| 6,839,682 B1 * | 1/2005 | Blume et al. | ............ | 705/7.31 |
| 7,099,479 B1 | 8/2006 | Ishibashi et al. | | |
| 7,099,846 B1 | 8/2006 | Ishibashi et al. | | |
| 7,120,629 B1 * | 10/2006 | Seibel et al. | ............ | 1/1 |
| 7,353,541 B1 | 4/2008 | Ishibashi et al. | | |
| 7,376,580 B1 * | 5/2008 | Walker et al. | ............ | 705/14.36 |
| 7,739,153 B1 * | 6/2010 | Anderson et al. | ............ | 705/26.64 |
| 2001/0014868 A1 * | 8/2001 | Herz et al. | ............ | 705/14 |
| 2002/0032905 A1 | 3/2002 | Sherr et al. | | |
| 2002/0062290 A1 * | 5/2002 | Ricci | ............ | 705/59 |

(Continued)

OTHER PUBLICATIONS

Wang, Hui-Chih et al., An Investigation into the Determinants of Repurchase Loyalty in the E-marketplace, Jan. 22, 2008, IEEE, pp. 1-10.*

(Continued)

*Primary Examiner* — Fadey Jabr
(74) *Attorney, Agent, or Firm* — Fish & Richardson P.C.

(57) ABSTRACT

Methods, systems, and apparatus, including computer programs encoded on computer storage media, for dynamically pricing electronic content. In one aspect, a method includes determining a likelihood that a group of users will repurchase an item of electronic content, determining that a particular user is more or less likely to repurchase the item of electronic content than the users of the group, in response to determining that the particular user is more or less likely to repurchase the item of electronic content than the users of the group, adjusting a base price associated with repurchasing the item of electronic content, and providing the particular user with an offer to repurchase the item of electronic content at the adjusted price.

24 Claims, 4 Drawing Sheets

U.S. PATENT DOCUMENTS

| | | | |
|---|---|---|---|
| 2002/0095327 A1* | 7/2002 | Zumel et al. | 705/10 |
| 2002/0123956 A1 | 9/2002 | Galuten | |
| 2002/0146122 A1* | 10/2002 | Vestergaard et al. | 380/231 |
| 2002/0152874 A1* | 10/2002 | Vilcauskas et al. | 84/600 |
| 2002/0194058 A1* | 12/2002 | Eldering | 705/10 |
| 2003/0023505 A1* | 1/2003 | Eglen et al. | 705/26 |
| 2003/0033223 A1 | 2/2003 | Mizuno | |
| 2003/0177055 A1* | 9/2003 | Zimmerman et al. | 705/10 |
| 2003/0181242 A1 | 9/2003 | Lee et al. | |
| 2003/0216956 A1* | 11/2003 | Smith et al. | 705/10 |
| 2004/0068451 A1* | 4/2004 | Lenk et al. | 705/28 |
| 2004/0136698 A1 | 7/2004 | Mock | |
| 2005/0044191 A1 | 2/2005 | Kamada et al. | |
| 2006/0143268 A1* | 6/2006 | Chatani | 709/203 |
| 2006/0149681 A1* | 7/2006 | Meisner | 705/52 |
| 2006/0259432 A1* | 11/2006 | Ishibashi et al. | 705/52 |
| 2007/0055568 A1* | 3/2007 | Osborne | 705/14 |
| 2007/0067301 A1 | 3/2007 | Malik | |
| 2007/0250402 A1* | 10/2007 | Blanchard et al. | 705/26 |
| 2008/0065471 A1* | 3/2008 | Reynolds et al. | 705/10 |
| 2008/0154633 A1 | 6/2008 | Ishibashi et al. | |
| 2008/0162268 A1* | 7/2008 | Gilbert | 705/10 |
| 2008/0201386 A1* | 8/2008 | Maharajh et al. | 707/201 |
| 2008/0319650 A1* | 12/2008 | Aaltonen et al. | 701/207 |
| 2009/0106059 A1 | 4/2009 | Megiddo et al. | |
| 2009/0157449 A1* | 6/2009 | Itani et al. | 705/7 |
| 2009/0171754 A1* | 7/2009 | Kane et al. | 705/10 |
| 2009/0307145 A1* | 12/2009 | Mesaros | 705/80 |
| 2010/0017259 A1* | 1/2010 | Luo | 705/10 |
| 2010/0037264 A1 | 2/2010 | Hardacker et al. | |
| 2010/0107258 A1 | 4/2010 | Park et al. | |
| 2010/0125585 A1* | 5/2010 | Chu et al. | 707/748 |
| 2010/0149093 A1* | 6/2010 | Edwards | 345/156 |
| 2010/0205064 A1* | 8/2010 | Lutnick et al. | 705/26 |
| 2010/0262464 A1* | 10/2010 | Monteforte et al. | 705/10 |
| 2011/0184813 A1 | 7/2011 | Barnes et al. | |
| 2011/0295671 A1* | 12/2011 | Thomas et al. | 705/14.25 |

OTHER PUBLICATIONS

Infosino, William J., Forecasting New Product Sales From Likelihood of Purchase Ratings, Fall 1986, Marketing Science, vol. 5, No. 4.*

Radas, Sonja, Pricing Strategy and Learning, Jun. 28, 2000.*

Wortham, J., 'The iPod Gold Rush,' The New York Times, Apr. 3, 2009, 5 pages, reprinted from http://www.nytimes.com/2009/04/05/fashion/05iphone.html?_r=1&pagewanted=all on Dec. 20, 2010.

Office Action for U.S. Appl. No. 12/973,121 dated Jan. 12, 2012. 23 pages.

Office Action for U.S. Appl. No. 12/984,710 dated Feb. 23, 2012. 32 pages.

Office Action for U.S. Appl. No. 13/250,437 dated Feb. 24, 2012. 34 pages.

* cited by examiner

DYNAMIC PRICING OF ELECTRONIC CONTENT

CROSS-REFERENCE TO RELATED APPLICATION

This application is a continuation of and claims the benefit of priority from U.S. patent application Ser. No. 12/973,121, filed Dec. 20, 2010, titled "DYNAMIC PRICING OF ELECTRONIC CONTENT." The entire content of the prior application is hereby incorporated by reference.

BACKGROUND

This specification relates to the consumption and re-consumption of electronic content.

A user may consume electronic content by, for example, watching a video recording, reading an electronic book, playing a game, or listening to an audio recording or ringtone. Oftentimes, a user may pay a service provider for the ability to consume electronic content. For example, in exchange for payment, a video rental service may allow a user to watch a video recording during a predetermined time period. Once the predetermined time period has expired, the user must pay the video rental service again, or "repurchase" the video recording, for the ability to re-watch, or "re-consume," the video recording.

SUMMARY

Using any of the information that is accessible to a content publication system, the system may be able to calculate the likelihood in which typical users will repurchase a particular item of electronic content. This likelihood can be thought of the propensity of a group of users or, similarly, the propensity of a typical user, to repurchase the electronic content. The likelihood of a group of users can be calculated by selecting a representative frequency, by averaging, applying a weighted average of, or otherwise aggregating the respective frequencies of individual members of the group, by selecting a random frequency, or through any other approach.

Different items of electronic content are likely to be associated with different repurchasing rates or propensities. For instance, users may, in general, be more likely to repurchase or re-watch a movie with a complex theme than a slapstick comedy. Similarly, different groups of users are likely to have different repurchasing propensities for the same item of electronic content, such as in the case where men may prefer to re-watch action movies than, for example, romantic comedies, or where households with numerous family members may repurchase an item of electronic content to provide the opportunity for many or all of the family members to consume the item at least once.

In addition to propensity information, the content publication system may store or derive information which reflects an extent to which a particular user differs from a typical user, or from a group of users. Any information that the particular user chooses to share with the content publication system, such as past electronic content consumption information or social network behavior information, may be used to select the group of users.

According to one innovative aspect of the subject matter described by this specification, a system may use this information to tailor the price that is offered to the particular user to repurchase the particular item of electronic content. By not applying discounts for users that may, in relation to a typical user, be more inclined to repurchase a particular product, profits may increase. Similarly, by applying discounts for consumers that may be less inclined to repurchase a particular item of electronic content, sales to consumers who ordinarily might not repurchase content may increase.

According to another innovative aspect, the subject matter described in this specification may be embodied in methods that include the actions of determining a likelihood that a group of users will repurchase an item of electronic content, determining that a particular user is more or less likely to repurchase the item of electronic content than the users of the group, in response to determining that the particular user is more or less likely to repurchase the item of electronic content than the users of the group, adjusting a base price associated with repurchasing the item of electronic content, and providing the particular user with an offer to repurchase the item of electronic content at the adjusted price.

Other embodiments of these aspects include corresponding systems, apparatus, and computer programs, configured to perform the actions of the methods, encoded on computer storage devices.

These and other embodiments may each optionally include one or more of the following features. For instance, from among other data that is stored on a computer-readable storage medium in association with the item of electronic content, a base price associated with repurchasing the item of electronic content is determined; the adjusted price is stored on a computer-readable medium; a base price associated with repurchasing the item of electronic content is determined, wherein the base price is stored on a computer readable storage medium; the adjusting is performed by one or more computers; determining a likelihood that the group of users user will repurchase an item of electronic content further includes determining, for each user of the group, a likelihood that the user will repurchase the item of electronic content, and aggregating the likelihoods for each user of the group; adjusting the base price further includes adjusting the base price upward based on determining that the particular user is more likely to repurchase the item of electronic content than the users of the group, and adjusting the base price downward based on determining that the particular user is less likely to repurchase the item of electronic content than the users of the group; adjusting the base price further includes determining an extent to which the particular user is more or less likely to repurchase the item of electronic content than the users of the group, and adjusting the base price in correlation with the extent to which the particular user is more or less likely to repurchase the item of electronic content than the users of the group; determining a likelihood that a group of users will repurchase an item of electronic content further includes determining a number of users in the group of users that have paid to consume the item of electronic content in the past, determining a number of users in the group of users that have also paid to repurchase the item of electronic content, and dividing the number of users in the group that have also paid to repurchase the item of electronic content by the number of users in the group that have paid to consume the item of electronic content; determining a likelihood that a group of users will repurchase an item of electronic content further includes estimating a likelihood that the group of users will repurchase an item of electronic content; determining that the particular user is more or less likely to repurchase the item of electronic content further includes determining information about the particular user, assigning the particular user to a segment of users based on the information, determining a likelihood of the segment of users to which the particular user is assigned to repurchase the item of electronic content, and comparing the likelihood of the segment of users to which the particular user is assigned, to the likelihood of the group of users; determining information about the particular user further includes identifying a search term entered by the particular user; determining information about the particular user further includes identifying a search result selected by the particular user; determining information about the particular user further includes identifying one or more other items of electronic content that the particular user has consumed in the past; determining information about the particular user further includes identifying one or more other items of electronic content that the particular user has purchased in the past; determining information about the particular user further includes identifying one or more other items of electronic content in which the particular user has expressed interest; the actions include determining a quantity of items of electronic content that the particular user has paid to repurchase during a predetermined period of time in the past, where determining a likelihood that the group of users will repurchase an item of electronic content further includes determining an average quantity of items of electronic content that the group of users has paid to repurchase during the predetermined period of time in the past, and determining that a particular user is more or less likely to repurchase the item of electronic content than the group of users further includes comparing the quantity of items of electronic content that the particular user has paid to repurchase, to the average quantity of items of electronic content that the group of users has paid to repurchase; the item of electronic content includes an audio or video recording, a game, a ringtone, a mobile device application, or a wallpaper; determining that a particular user is more or less likely to repurchase the item of electronic content than the users of the group further includes determining an extent to which the particular user has consumed the item of electronic content; determining a likelihood that a group of users will repurchase an item of electronic content further includes determining an average likelihood that the group of users will repurchase an item of electronic content; determining a likelihood that a group of users will repurchase an item of electronic content further includes determining a weighted average of the likelihood that each user of the group will repurchase an item of electronic content; the actions also include selecting the group of users; selecting the group of users further includes selecting users that exhibit similar demographic, purchase behavior, or consumption behavior characteristics to the particular user; the group of users is selected based on a social network behavior of the particular user; adjusting a base price associated with repurchasing the item of electronic content further includes comparing the adjusted base price to a floor price or a ceiling price, and establishing the floor price or the ceiling price as the adjusted base price based on the comparison; the actions include determining a quantity of items of electronic content associated with the offer, where the base price associated with repurchasing the item of electronic content is further adjusted based on the quantity of items.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
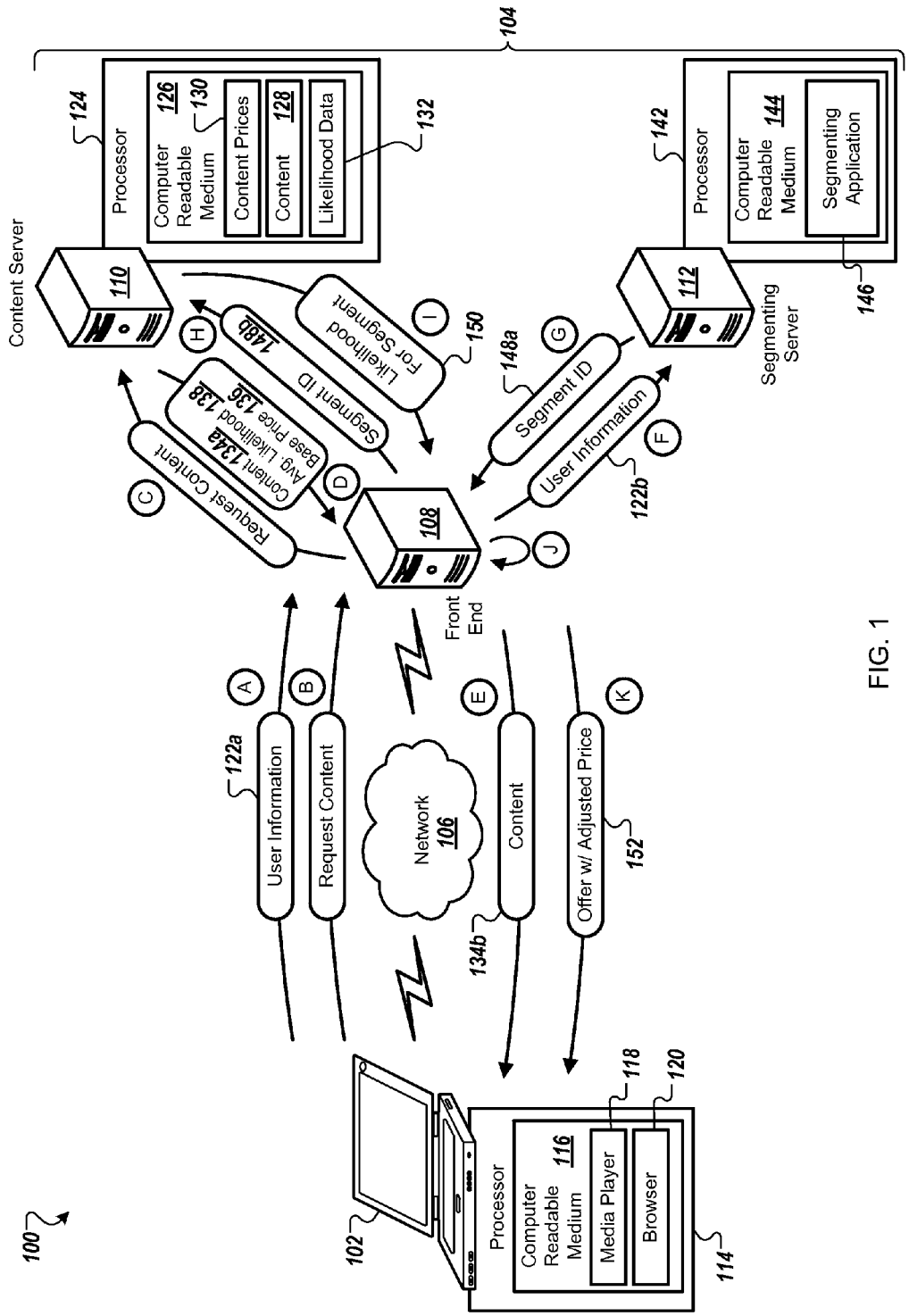
FIGS. 1 and 4 are diagrams of example systems that may dynamically price the repurchasing of electronic content.

FIG. 1 is a diagram of an example system 100 that may dynamically price the repurchasing of electronic content. The system 100 may present an offer to a user, providing the user with an option to repurchase an electronic content item. A repurchasing price may be determined, where the repurchasing price may be an adjustment of a base price associated with repurchasing the electronic content item.

For example, a group of users is selected, i.e., from a general population of users, from among users that have consumed a particular item of electronic content, from social network connections (e.g., "friends," or "friends of friends") of a particular user, or from among users that are similar to a particular user. A likelihood that the group of users will repurchase the electronic content item may be determined, and the base price may be adjusted in response to determining that the user is more or less likely to repurchase the electronic content item than the users of the group. The likelihood may be expressed in many ways, such as a rate or frequency.

If the user is more likely to repurchase the electronic content item than the users of the group, then the base price may be increased. If the user is less likely to repurchase the electronic content item than the group of users, the base price may be lowered. Determining whether the user is more or less likely than the group of users to repurchase the electronic content item may include determining information about the user, assigning the user to one or more segments of similar users based on the information, and determining a repurchasing likelihood associated with the one or more segments of similar users.

In further detail, the example system 100 includes a client device 102 and a content provider system 104, connected by way of a network 106. The network 106 may be a private network, such as an intranet, a public network, such as the Internet, or some combination thereof. The client device 102 may be, for example, a laptop computer, desktop computer, television, set top box, mobile phone, PDA (Personal Digital Assistant), smart phone, BlackBerry™ or other handheld or mobile device. The content provider system 104 includes a front-end server 108, a content server 110, and a segmenting server 112. The segmenting server 112, the content server 110, and the front-end server 108 are connected by way of the network 106, or some other network.

The client device 102 includes a processor 114 and computer-readable medium 116. The processor 114 may be a processor suitable for the execution of a computer program, such as a general or special purpose microprocessor. In some implementations, the client device 102 includes more than one processor 114. The computer-readable medium 116 stores and records information or data, and may be an optical storage medium, magnetic storage medium, flash memory, or any other storage medium type.

The computer-readable medium 116 includes applications, such as a media player application 118 and a browser 120. The browser 120 may be configured to request, receive, and display content, such as web pages. The media player application 118 may be configured to play an item of electronic content (e.g., a movie or other video, a song or other audio, an electronic book) for consumption or re-consumption by the user. The media player 118 may play, for example, items of electronic content received from the content provider system 104.

During an initial state "A", the client device 102 provides user information 122a to the content provider system 104 related to the client device 102 or related to the user of the client device 104. For situations in which the systems discussed here collect personal information about users, the users may be provided with an opportunity to opt in/out of programs or features that may collect personal information (e.g., information about a user's preferences or a user's current location). The user may also be informed of the accompanying limitations on the functionality of a service that may result from limiting access to such personal information. In addition, certain data may be anonymized in one or more ways before it is stored or used, so that personally identifiable information is removed. For example, a user's identity may be anonymized so that no personally identifiable information may be determined for the user, or a user's geographic location may be generalized where location information is obtained (such as to a city, zip code, or state level), so that a particular location of a user cannot be determined.

During the state "A", the client device 102 may, over time, directly or indirectly provide the user information 122a to the content provider system 104. For example, information relating to a user's actions using the media player 118 may be provided, such as an identity of electronic content items that have been consumed or purchased by the user, such as movies that have been viewed or audio songs that have been played, or an identity of electronic content items that have been downloaded or that are otherwise included in a media library associated with the user (e.g., a media library stored on the client device 102 or a media library stored in the content provider system 104 or in another system). The user information 122a may include information that indicates one or more other items of electronic content in which the user has expressed an interest. The user information 122 may, for example, include search terms that the user has entered to initiate search queries, or information that is indicative of the social network behavior of the user.

At a later time, during a state "B", the user, using the client device 102, requests a particular item of electronic content. For example, the user may request to rent a movie or other video recording, book, software item, online periodical, audio recording, or a video game, to name a few examples. The user may request to rent the item of electronic content, for example, using an interface displayed in the browser 120. As another example, the user may request to rent the item of electronic content using an interface displayed on a television screen. The request is transmitted over the network 106 and is received by the front-end server 108.

During a state "C", the front-end server 108 requests the electronic content item and information about the electronic content item from the content server 110. The content server 110 includes a processor 124 and computer-readable medium 126. The computer-readable medium 126 stores and records information or data, such as electronic content items 128, content repurchasing prices 130, and likelihood data 132. For each electronic content item 128, a corresponding content repurchasing price 130 indicates a base repurchasing price for the electronic content item 128. Also for each electronic content item 128, a corresponding likelihood may be retrieved or determined from the likelihood data 132 which indicates a likelihood that a group of users will repurchase the electronic content item 128.

During a state "D", the content server 110 retrieves and sends a requested electronic content item 134a, a corresponding base repurchasing price 136, and a corresponding likelihood 138 for the group of users to the front-end server 108. During a state "E", the front-end server 108 provides the electronic content item 134b to the client device 102. For example, the electronic content item 134b may be downloaded or streamed to the client device 102, the client device 102 may be provided a link or a license to the electronic content item 134b, or some other approaches may be used to provide the electronic content item 134b to the client device 102. The user may consume all, part, or none of the electronic content item 134b using the client device 102.

During state "F", the front-end server 108 provides user information 122b for the user to the segmenting server 112. The user information 122b may be provided to the segmenting server 112 before, in parallel with, or after the electronic content item 134b is provided to the client device 102. The segmenting server includes a processor 142 and computer-readable medium 144. The computer readable medium 144 includes a segmenting application 146, which may be used to identify one or more user segments associated with the user, based on the user information 122b. The segmenting server 112 may be a server that is used to implement a social network.

Various segmenting algorithms may be used, such as identifying a segment of users that have entered a same search query or that have previously consumed a same set of electronic content items as the user. One such segmenting algorithm is described in U.S. Pat. No. 7,739,314, which is incorporated herein by reference.

Another such segmenting algorithm segments users based on their social network behavior, such as by selecting social network connections of the user. For instance, the segmenting server 112 may select, as the segment of users, the social network "friends" of the user, the "friends of the friends" of the user, the "friends of the friends of the friends" of the user, and so on. Other social network relationships other than "friend" relationships may also be used as the basis for the segmentation, such as by selecting groups of users that "like" or "dislike" the same things, users that have communicated with each other or in a particular forum, that have similar commenting or updating habits, or that play the same social network games.

During a state "G", the segmenting server 112 sends a segment identifier 148a for a segment associated with the user to the front-end server 108. In a state "H", the front-end server 108 sends a segment identifier 148b to the content server 110. As another example, the segmenting server 112 may send the segment identifier 148a to the content server 110.

During a state "I", the content server 110 calculates a likelihood that is particular to the electronic content item and to the identified segment. That is, the content server 110 may calculate an likelihood that users in the segment will pay (or have paid) to repurchase the electronic content item. For example, the content server 110 may determine, using the likelihood data 132, what percentage of users in the segment who consumed the electronic content item also repurchased the electronic content item. An likelihood 150 for the segment is sent to the front-end server 108. If the segmenting server identifies multiple segment identifiers, the front-end server 108 (or the content server 110) may calculate a segment likelihood.

During a state "J", the front-end server 108 calculates an adjusted repurchasing price based on the base repurchasing price 136 and based on the received likelihood 150 for the segment. The front-end server may, for example, compare the likelihood 150 of the segment to the likelihood 138 for the users of the group. If the likelihood 150 for the segment is greater than the likelihood 138 for the users of the group, the front-end server 108 may adjust the base repurchasing price 136 upward. If the likelihood 150 for the segment is less than the likelihood 138 for the users of the group, the front-end server 108 may adjust the base repurchasing price 136 downward.

The comparison of the likelihood 150 for the segment to the likelihood 138 for the users of the group may be a direct comparison, with an adjustment upward or downward occurring if the difference is greater than a threshold. As another example, the likelihood 150 for the segment and the likelihood 138 for the users of the group may each be represented by a tier value. For example, relating to a likelihood to repurchase, the likelihood 150 for the segment and the likelihood 138 for the users of the group may each be one of: 'highly likely,' 'likely,' 'neutral,' 'unlikely,' or 'highly unlikely.' The base repurchasing price 136 may be adjusted upward or downward if the likelihood 150 is a different tier value than the likelihood 138 for the users of the group. For example, the base repurchasing price 136 may be adjusted upward if the likelihood 138 for the users of the group is likely and the likelihood 150 for the segment is highly likely.

During a state "K", the front-end server 108 provides an offer 152 to the client device 102, which offers an opportunity to the user to repurchase the electronic content item 134b at the adjusted price. The offer 152 may be displayed, for example, on a web page, or on a television screen.

If the user accepts the offer, then the front end 108 may process payment for the additional opportunity, and consumption of the electronic content item 134b may be enabled for an additional period of time. For example, a license may be provided, an existing license may be updated, the electronic content 134b may be resent to the client device 102, or some other operation that enables repurchasing of the electronic content item 134b may be performed. The front-end server 108 may record whether the user accepts the offer 152, and user information for the user and the segments of users to which the user is assigned may be updated.

Once consumption of the electronic content item 134b is enabled, the user or another user may watch or re-watch the electronic content item 134b. For instance, the user may re-consume the electronic content item 134b by re-watching (or having someone else re-watch) the entire electronic content item 134b, by watching (or having someone else re-watch) a portion of the electronic content item 134b that they had previously watched, or by watching (or having someone else re-watch) a portion of the electronic item 134b that they had not previously watched.

Figure 2:
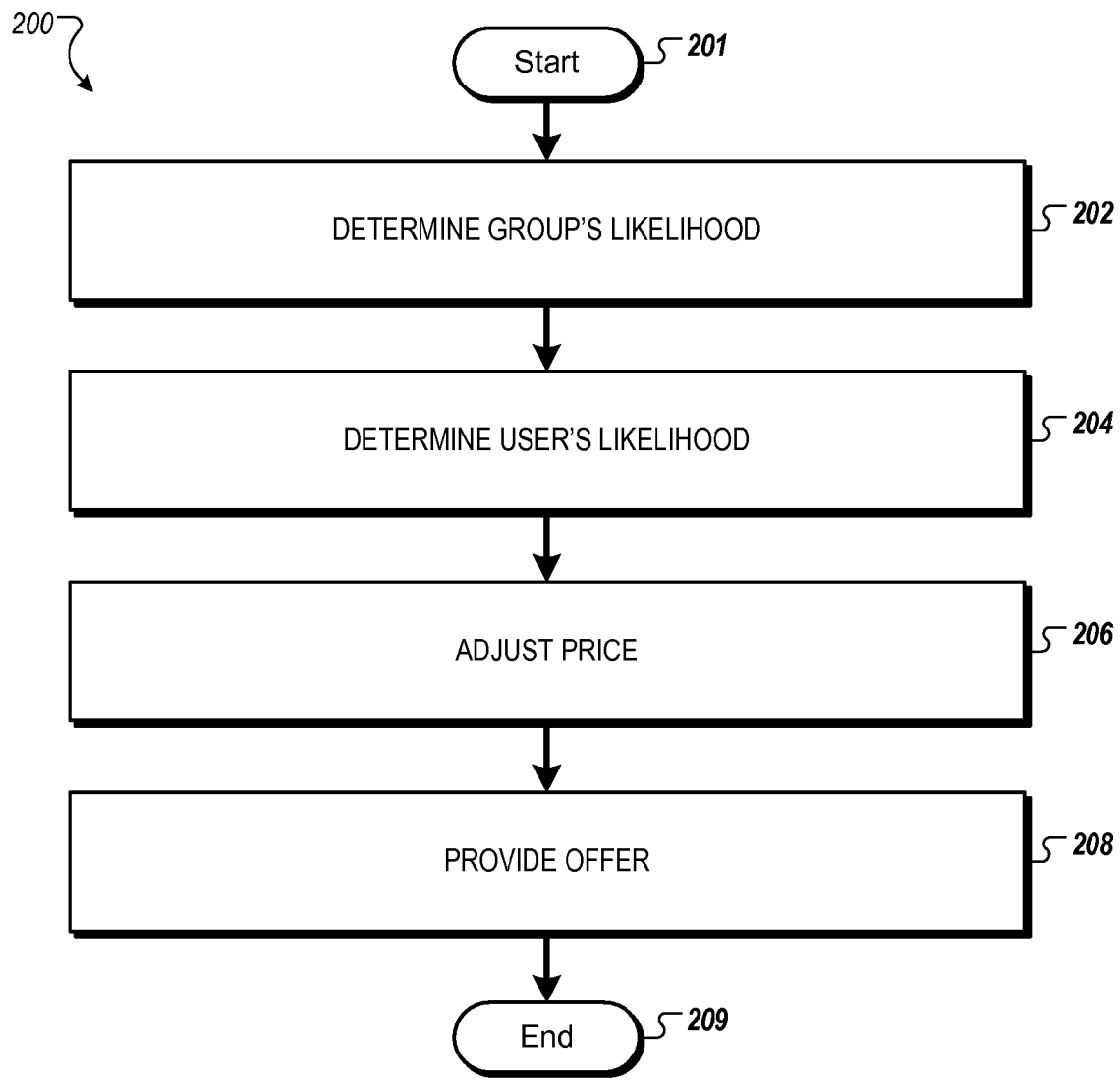
FIG. 2 is a flowchart of a process.

FIG. 2 is a flowchart of a process 200. Briefly, the process 200 includes the actions of determining a likelihood that a group of users will repurchase an item of electronic content, determining that a particular user is more or less likely to repurchase the item of electronic content than the users of the group, adjusting a base price associated with repurchasing the item of electronic content, in response to determining that the particular user is more or less likely to repurchase the item of electronic content than the users of the group, and providing the particular user with an offer to repurchase the item of electronic content at the adjusted price.

In more detail, when the process 200 begins (201), a group of users is selected, and a likelihood that the group of users will repurchase an item of electronic content is determined. The group of users may represent all or part of a population of users, such as all users that have consumer the item of electronic content, users that share similar preferences to a particular user, users that have been selected by a particular user, or users that are similar to a particular user. For instance, a group of users that have the same demographic characteristics, i.e., gender, age, residence location, may be selected, as may a group of users with similar purchase or consumption behavior.

Similarly, the group of users may be selected based on the social network behavior of a particular user, or a group of users. For instance, the group may represent those users who are members of a same social network, or users that have "friended" or communicated with a particular user or with friends of the particular user. As another example, the group of users may be associated with a group to which the user has applied a "like" tag, or a group to which the user has subscribed or requested membership.

The item of electronic content may be, for example, a movie or other video recording, an audio recording, an electronic book, a whitepaper, a periodical, a video game, a software program, wallpaper, a mobile device application, or some other type of electronic content. The users of the group may be represented by an "average user," which is a fictitious, user, and the likelihood that the user of the group will repurchase the item of electronic content may be determined in a number of ways.

For example, for each user of a group of users, a likelihood that the user will repurchase the item of electronic content may be determined, and the likelihood for the group of users may be determined by aggregating the likelihoods for each user of the group. The likelihood for a particular user may be determined, for example, by determining, out of items of electronic content that the user has consumed in the past, a percentage of those items that the user has paid to repurchase. When processing the group of users, some users may be excluded from this calculation, if, for example, no data, very little data, or only very recent data exists for the user. Or, as another example, an estimated likelihood may be used for some users.

As a particular example, suppose that a first user has consumed "10" items of electronic content in the past, and has paid to repurchase "2" items (e.g., for a repurchasing rate of "20%"). A second user may have consumed "5" items of electronic content in the past and may have paid to repurchase "2" of those items (e.g., for a repurchasing rate of "40%" percent). A third user may have consumed "4" items of electronic content in the past and may not have paid to repurchase any items (e.g., a repurchasing rate of "0%"). The likelihood that users of the group will repurchase the item of electronic content may be determined by combining or aggregating the repurchasing rates of the three users (e.g., averaging "20%", "40%", and "0%"', for a combined likelihood of "20%").

The repurchasing rates may be determined in other ways, for example by applying a weighted average, by selecting a representative value, or by selecting a random one of the available values. When applying a weighted averages, values may be weighted based on the similarity of a respective user to the particular user.

As another example of determining a likelihood that the group of users will repurchase an item of electronic content, a first number and a second number may be determined, where the first number represents the number of users in a group of users that have paid to consume the item of electronic content in the past and the second number represents the number of users in the group that have also paid to repurchase the item of electronic content. The likelihood may be determined by dividing the second number by the first number. For example, if, out of a group of users, "500" users have paid to consume the item of electronic content and "180" users in the group have also paid to repurchase the item of electronic content, then a likelihood that a user of the group will repurchase the item of electronic content may be determined by dividing "180" by "500", for a likelihood of "36%".

In some implementations, an estimated likelihood may be used as the likelihood that a group of users will repurchase the item of electronic content. For example, an estimated likelihood may be used if the item of electronic content is new (e.g., a recently released movie), since the new item of electronic content may have no or only a small amount of consumption and repurchasing history. To determine an estimated likelihood, a likelihood for one or more related or similar items of electronic content may be determined.

For example, for movie content, a related movie with similar or at least some of the same actors, or with a similar or the same director, or having a same genre, or with a similar critic review, may be identified. As another example, for music content, related music by the same or by a similar artist, or having a similar music style, or produced by the same record label, may be identified. If one related item of electronic content is identified, then a likelihood for the related item may be determined and may be used as the estimated likelihood. If more than one related item of electronic content is identified, then a likelihood may be determined for each related item and a likelihood of the related items may be determined and may be used as the estimated likelihood.

Other approaches may be used to determine a likelihood that the users of the group will repurchase the item of electronic content. For example, a repurchasing rate may be determined, based on repurchasing behavior for any item of electronic content. For example, for each user in a group of users, a quantity of items that the user has paid to repurchase during a predetermined period of time in the past (e.g., the past year) may be determined. For example, it may be determined that, on average, users in a group of users repurchase four items of electronic content per year. As another example, the amount of money that an average user spends to repurchase items of electronic content during the predetermined period of time may be determined. For example, it may be determined that, on average, users in a group of users spend thirty dollars per year to repurchase items of electronic content.

It is determined that a particular user is more or less likely to repurchase the item of electronic content than the users of the group (204). For example, related to the example above where a repurchasing rate, e.g., a representative rate, a randomly selected rate, an aggregated rate, an average rate or a weighted average weight, is determined for a group of users, a quantity of items of electronic content that the user has paid to repurchase during a predetermined period of time may be determined, and this value may be compared to the average quantity of items of electronic content that users of the group have paid to repurchase.

For example, if, on average, users in the group repurchase "5" items of electronic content per year and if the user pays to repurchase "10" items of electronic content per year, then it may be determined that the user is more likely to repurchase the item of electronic content than the average user. As another example, if the users in a group typically pay "$30" per year to repurchase items of electronic content and if the user spends "$3" dollars per year to repurchase items of electronic content, then it may be determined that the user is less likely than the average user to repurchase the item of electronic content.

As another example, an extent to which the user has consumed the item of electronic content may be determined, and a likelihood for the user may be determined based on the determined extent. For example, it may be determined that users who have consumed only a portion of the item of electronic content (e.g., users who have watched only a portion of a movie) may be more likely to repurchase the item of electronic content than users who have entirely consumed the item of electronic content. As another example, it may be determined, for the particular item of electronic content, that users who have consumed the item up to a particular point in the content (e.g., users who have watched a movie up to but not including a particularly interesting point in the movie) may be more likely to repurchase the item of electronic content than users who have either entirely consumed the item or who have consumed the item past the particular point in the content.

As another example of determining whether the user is more or less likely to repurchase the item of electronic content, it may be determined whether users similar to the user are more or less likely to repurchase the item of electronic content. For example, information may be determined about the user, the user may be assigned to one or more segments of users based on the information, a likelihood to repurchase the item of electronic content for the segment(s) to which the user is assigned may be determined, and the likelihood for the segment may be compared to the likelihood for the users of the group.

In further detail, determining information about the user may include, for example, determining the user's age, gender, geographic location, or other demographic information. As another example, past actions of a user may be determined. For example, a user's past or recently-entered search terms may be determined, such as search terms entered using one or more search engines. Also, search results generated for or selected for the user may be determined. Other aspects of a user's browsing history may be determined. In some implementations, user information related to actions older than a threshold date (e.g., one year from the current date) may be ignored or otherwise excluded from consideration, or may be given a lesser weight than information related to more recent actions of the user.

Other examples of determining information about the user include identifying one or more other items of electronic content that the user has either previously consumed, purchased, or has otherwise expressed interest for the item. For example, it may be determined which movie items the user has viewed, which songs the user has played or has downloaded to or selected for inclusion in a music library, which items the user has placed into an electronic shopping cart, or items for which the user has browsed for information. Other examples include items the user has purchased for personal use or for others, or items that others have purchased for the user. For items identified for the user, it may be determined if two or more of the items include one or more common characteristics, such as a common actor, director, artist, or genre.

As mentioned, the user may be assigned to one or more segments or clusters based on the determined user information. For example, a user may be assigned to a segment of users who have expressed interest in a particular actor or actors, particular artists, a particular director, a particular genre of movies, or a particular style of music, to name a few examples. As another example, a user may be assigned to a segment based on age, gender, location, or some other demographic. In some implementations, a user may be assigned to a "default" segment, such as if the user's previously-entered search terms don't match any defined segment, or if the user has little or no electronic item consumption history.

To determine an likelihood to repurchase the item of electronic content for an identified segment, the number of users in the segment who have paid to repurchase the item of electronic content may be divided by the number of users who have consumed the item of electronic content. For example, if the item of electronic content is an action movie, and if the user is included in a segment of users who have watched action movies in the past, and if the number of users in the segment who have rented the action movie is fifty, and if the number of users in the segment who have paid to repurchase the action movie is thirty, then the likelihood to repurchase the action movie for the segment may be calculated as thirty divided by fifty, or sixty percent. If the user is assigned to more than one segment, an likelihood for each segment may be determined, and an overall value for all segments may be determined using the likelihoods of each segment.

When comparing the likelihood for the segment to the likelihood of the users of the group, it may be determined that the user is more or less likely to repurchase the item of electronic content than the users of the group if the difference between the likelihood for the segment and the likelihood of the users of the group is more than a threshold. For example, if the likelihood for the segment is "30%" and the likelihood of the users of the group is "20%", it may be determined that the user is more likely to repurchase the item of electronic content than the users of the group, such as if a difference threshold of "5%".

As another example, if the likelihood for the segment is "20%" and the likelihood of the users of the group is "15%," it may be determined that the user is not more or less likely to repurchase the item of electronic content than the users of the group, such as if a difference threshold of "10%" is used. As a third example, if the likelihood for the segment is "15%" and the likelihood of the users of the group is "20%," it may be determined that the user is less likely to repurchase the item of electronic content than the users of the group, such as if a difference threshold of "8%" is used.

Other comparison approaches may be used. For example, both the likelihood for the segment and the likelihood for the group of users user may each be represented by a tier value. For example, tier values of 'highly likely,' 'likely,' 'neutral,' 'unlikely,' or 'highly unlikely' may be used. It may be determined that the user is more or less likely than the group of users to repurchase the item of electronic content if the likelihood for the segment has a different tier value than the likelihood for the group of users. For example, it may be determined that the user is more likely to repurchase the item of electronic content if the likelihood for the segment is likely and the likelihood for the users of the group is neutral.

Other than identifying one or more segments associated with the user, other approaches may use the determined user information to determine whether the user is more or less likely than the group of users to repurchase the item of electronic content. For example, the user information may be compared to characteristics of the electronic content item and a similarity metric may be determined for the user based on how similar the user information is to the characteristics of the electronic content item. The similarity metric for the user may be compared to a predetermined average similarity metric for the electronic item (e.g., where the predetermined average similarity metric indicates, on average, how closely typical user information matches the characteristics of the electronic content item).

Example electronic content item characteristics include artist name, style or genre, director name, etc. The user information may be similar to the electronic item characteristics, for example, if search terms previously entered by the user match or are similar to the electronic item characteristics (e.g., the user may have previously entered the artist name as a search term). As another example, suppose the user information indicates that the user likes a certain music artist, and suppose that the item of electronic content is a movie which includes one or more songs by the artist. The similarity metric for the user may be increased due to the movie including songs by the artist liked by the user.

The social network behavior of the particular user may be used to determine whether the particular user is more or less likely than the group of users to repurchase the item of electronic content. For instance, the degree to which the particular user is connected to, or has interacted with, one or more users of the group may be used to determine whether the particular user is similar to the group, and thus may exhibit a similar repurchasing likelihood. The degree to which the particular user is connected to, or interacted with, other users that have higher or lower repurchasing likelihoods can also be used as a basis to determine the extent to which the user exhibits a similar repurchasing likelihood as the group.

In response to determining that the particular user is more or less likely to repurchase the item of electronic content than the users of the group, a base price associated with repurchasing the item of electronic content is adjusted (206). For example, the base price may be adjusted upward based on determining that the particular user is more likely to repurchase the item of electronic content than the users of the group and the base price may be adjusted downward based on determining that the particular user is less likely to repurchase the item of electronic content than the users of the group.

As another example, an extent to which the particular user is more or less likely to repurchase the item of electronic content than the users of the group may be determined and the base price may be adjusted in correlation with the determined extent. The adjustment may be performed, for example, using a linear or non-linear calculation that adjusts the base price in proportion to the determined extent. For example, if the likelihood associated with the user (e.g., a likelihood for a segment associated with the user, or some other likelihood determined for the user) is "20%" percent more than a likelihood for the users of the group, then the base price may be adjusted upward by "20%."

As another example, if the likelihood for the user and the likelihood for the group of users are each expressed as tiers, then the adjustment may be based on an extent of difference between the tier for the user and the tier for the group of users. For example, if the tier for the user is 'neutral' and if the tier for the average user is 'likely' (e.g., the tiers are "one tier apart"), then the base price may be adjusted upward by "10%" and, if tier for the user is 'unlikely' and if the tier for the group of users is 'likely' (e.g., the tiers are "two tiers apart"), then the base price may be adjusted upward by "20%."

The base price might not be adjusted in some situations, such as if the difference in likelihood for the user and the likelihood for the group of users is less than a threshold. As another example, if the likelihood for the user and the likelihood for the group of users are each expressed as tiers, the base price might not be adjusted if both the likelihood for the user and the likelihood for the group of users both have the same tier value (e.g., if both values are a tier of "highly likely"). In some implementations, a base price may be adjusted in one direction (e.g., upward, downward) but not the other direction. For example, in some implementations, the base price may be adjusted downward if it is determined that the user is less likely to repurchase the item of electronic content than the group of users, but the base price may be maintained if it is determined that the user is equally or more likely to repurchase the item of electronic content than the group of users.

In some implementations, a ceiling or a floor price may be taken into account when adjusting the base price in an upward or downward direction, respectively. For example, if the user is less likely to repurchase the item of electronic content than the group of users, the base price may be adjusted downward but without becoming less than a floor price (e.g., a floor price of ninety nine cents). As another example, a purchase price of the item of electronic content may be determined, and if the user is more likely than the group of users to repurchase the item of electronic content, then a base price may be adjusted upward while taking the purchase price into account. For example, a maximum adjusted price may be calculated as the purchase price minus the original consumption price minus a delta value. For example, if the purchase price of the item of electronic content is "$15" and if the original consumption price is "$5", then the maximum adjusted price may be determined to be eight dollars (e.g., the purchase price ("$15") minus the original consumption price ("$5") minus a difference amount ("$2"). In other words, in this example, the amount the user spends on the total of the consumption and repurchasing of the item of electronic content may be less than or equal to "$2" less than the purchase price, or "$13".

The base price may also be adjusted based on other factors, such as the number of items of electronic content under considerations. For instance, the base price may be adjusted downward based on a bulk pricing model that offers the particular user an incentive for repurchasing more than one item. In one particular example, the user may be offered a significant discount for 'renewing' or 'topping up' an entire collection of items that the user has consumed in the past, or some subset thereof. In another example, the amount of the downward adjustment to the base price may correlate with the quantity of items of electronic content that the particular user chooses to repurchase, or that the system offers the user to repurchase.

The particular user is provided with an offer to repurchase the item of electronic content at the adjusted price (208), thereby ending the process 200 (209). For example, the offer may be provided to the user before, during, or after the user first consumes the item of electronic content. The offer may be provided to the user, for example, on a web page, on a television screen, through traditional mail, or by any other means. User information associated with the user may be updated with information that indicates whether the user accepted or rejected the offer. The offer may be communicated in a file, such as through HTML web page or an XML file.

If the particular user accepts the offer to repurchase the item of electronic content, the particular user (or another user) may watch or re-watch the item of electronic content. For instance, the particular user may re-consume the item of electronic content by re-watching (or having someone else re-watch) the item of electronic content, by watching (or having someone else re-watch) a portion of the item of electronic content that they had previously watched, or by watching (or having someone else re-watch) a portion of the item of electronic content that they had not previously watched.

Figure 3:
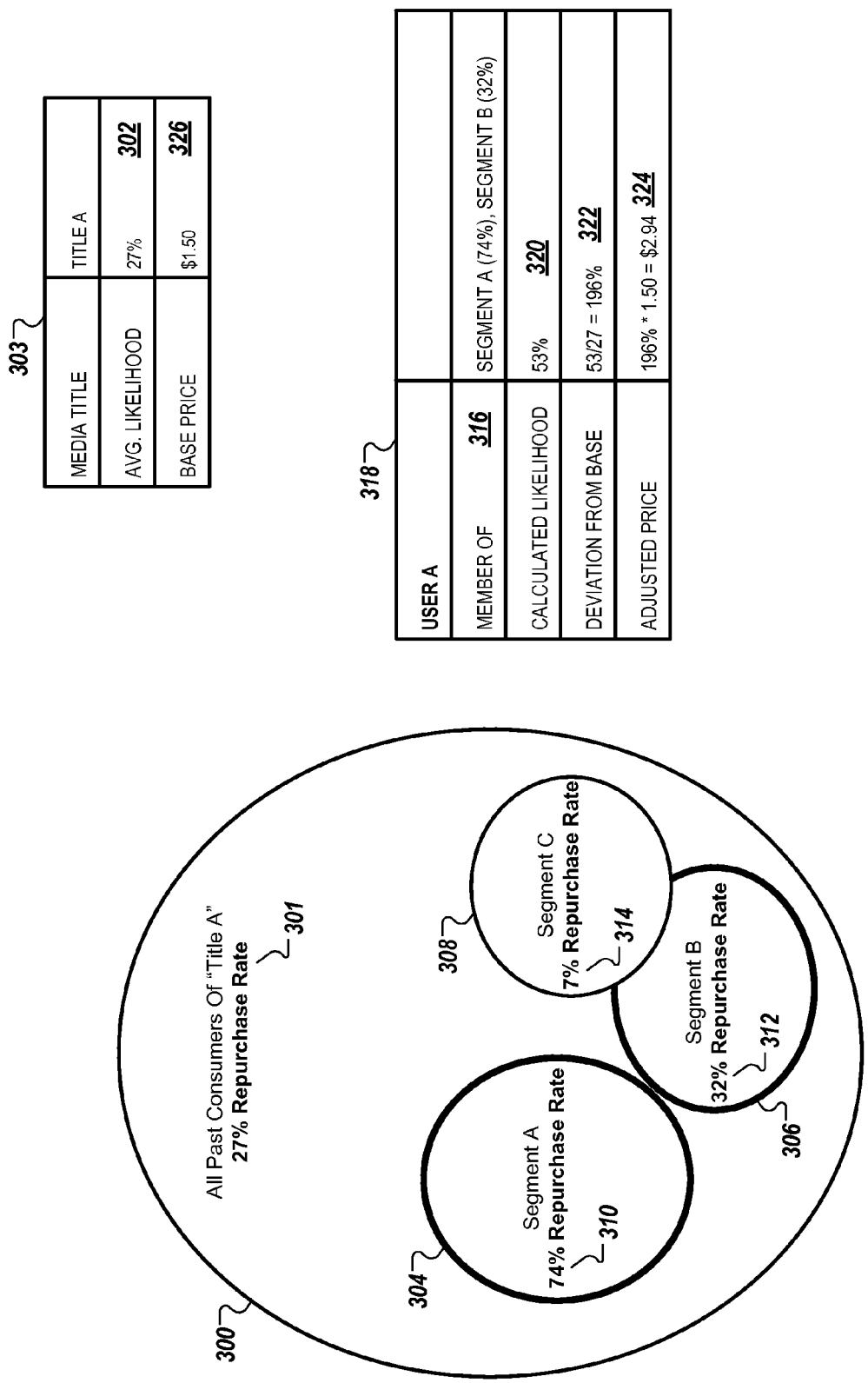
FIG. 3 is a diagram that illustrates segments of users.

FIG. 3 is a diagram that illustrates example user segments. Repurchasing data 300 includes data for all past consumers of a particular item of electronic content (e.g., an item with title "Title A"). For example, the repurchasing data 300 may include a base repurchasing rate 301, which indicates that, overall, twenty seven percent of users repurchased the particular item of electronic content. As indicated by a row 302 in a table 303, the base repurchasing rate 301 represents a likelihood that a group of users will repurchase "Title A".

The repurchasing data 300 may include one or more user segments. For example, the repurchasing data 300 includes a segment "A" 304, a segment "B" 306, and a segment "C" 308. The repurchasing data 300 may include a segment repurchasing rate for each segment. For example, segment repurchasing rates 310, 312, and 314 indicate, for segments 304, 306, and 308, respectively, that "74%", "32%", and "7%" of users in the respective segment repurchased the particular item of electronic content. A particular user may be associated with zero or more segments. For example, as indicated by thick segment border lines and by a row 316 in a table 318, the user "A" is associated with two segments, the segment "A" 304 and the segment "B" 306.

Segment repurchasing rates may be used when adjusting a base price associated with repurchasing an item of electronic content. For example, a calculated likelihood may be determined for the user based on the segment repurchasing rates of each segment associated with the user, and an adjusted price may be determined based on a deviation of the calculated likelihood from the base repurchasing rate. For instance, in the example of FIG. 3, a calculated likelihood 320 may be determined for user "A" by determining the average of the segment repurchasing rates for the segments associated with user "A" (e.g., the segments 304 and 306). Specifically, the calculated likelihood 320 may be calculated as an average of the segment repurchasing rate 310 (e.g., seventy four percent) and the segment repurchasing rate 312 (e.g., thirty two percent), or a value of fifty three percent. In some implementations, another algorithm may be used to determine the calculated likelihood 320, such as an algorithm that gives stronger weight to segment repurchasing rates for segments to which the user has a stronger association.

A deviation 322 from the base repurchasing rate 301 may be determined by dividing the calculated likelihood 320 by the base repurchasing rate 301, which, in the example of FIG. 3, results in a value of one hundred ninety six percent. An adjusted price 324 may be determined, for example, by multiplying the deviation 322 by a base price 326 associated with the "Title A" item. In the example of FIG. 3, the adjusted price 324 has a value of $2.94. Other approaches may be used to determine the adjusted price 324. For example, instead of a linear calculation, a non-linear calculation may be performed, or some other calculation using more than one operation may be performed. For example, a calculation may be used which ensures that the resulting adjusted price 324 is less than a purchase price associated with the "Title A" item.

Figure 4:
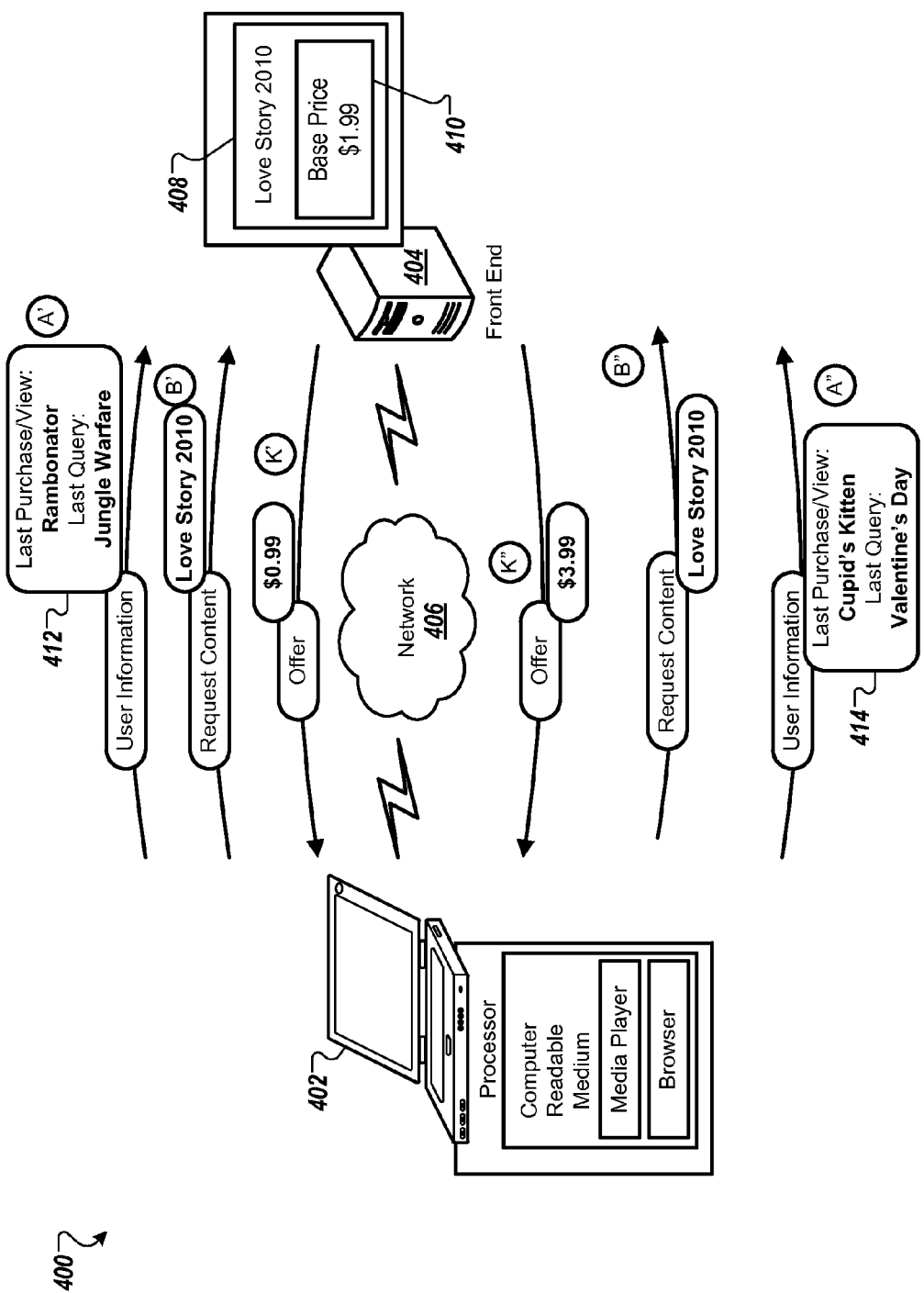

FIG. 4 is a diagram of an example system 400 that may be used for consumption and repurchasing of electronic content. Specifically, the example system 400 includes a client device 402 and a content provider system front-end server 404, connected by way of a network 406. The network 406 may be a private network, such as an intranet, a public network, such as the Internet, or some combination thereof. The content provider system front-end server 404 includes, or has access to, information 408 for a "Love Story 2010" electronic content item (e.g., an item associated with a romantic genre). For example, the information 408 may include, among other information, a base repurchasing price 410 of $1.99.

In a state "A'", user information 412 for a first user is provided to the content provider system front-end server 404. For example, the user information 412 may indicate that the electronic content item last purchased or viewed by the first user is an electronic content item with a title of "Rambonator" (e.g., an electronic content item associated with an action genre). As another example, the user information 412 may indicate that a last or recent search query entered by the first user included the query terms "jungle warfare" (e.g., query terms that may be associated with an action genre).

As another example, in a state "A'''", user information 414 for a second user is provided to the content provider system front-end server 404. For example, the user information 414 may indicate that the electronic content item last purchased or viewed by the second user is an electronic content item with a title of "Cupid's Kitten" (e.g., an electronic content item associated with a romantic genre). As another example, the user information 414 may indicate that a last or recent search query entered by the second user included the query terms "Valentine's day" (e.g., query terms that may be associated with a romantic genre).

In a state "B'", the first user requests the "Love Story 2010" item from the content provider system front-end server 404. In a later (undepicted) state, the first user consumes the "Love Story 2010" electronic content item. Similarly, in a state "B''", the second user requests the "Love Story 2010" electronic content item and subsequently consumes the item.

The content provider system front-end server 404 may determine, based on the user information 412, that the first user is less likely to repurchase the "Love Story 2010" electronic content item than the group of users. In response to such a determination, the base repurchasing price 410 may be adjusted downward for the first user. For example, in a state "K'", the first user is offered an opportunity to repurchase the "Love Story 2010" electronic content item at an adjusted price of $0.99.

As another example, the content provider front-end server 404 may determine, based on the user information 414, that the second user is more likely to repurchase the "Love Story 2010" electronic content item than the group of users, and in response, the base repurchasing price 410 may be adjusted upward for the second user. For example, in a state "K''", the second user is offered an opportunity to repurchase the "Love Story 2010" electronic content item at an adjusted price of $3.99.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A computer-implemented method comprising:
    determining, for each user in a group of users, a likelihood of the respective user to repurchase an item of electronic content that the respective user has already purchased;
    determining an aggregated likelihood that the group of users will repurchase the item of electronic content;
    determining, from among other data that is stored on a computer-readable storage medium in association with the item of electronic content, a base price associated with repurchasing a particular item of electronic content that has already been purchased;
    determining a portion of the particular item of electronic content that a particular user has consumed;
    determining, based upon the portion of the particular item of electronic content, that the particular user is more or less likely to repurchase the particular item of electronic content than the group of users;
    in response to determining that the particular user is more or less likely to repurchase the particular item of electronic content than the group of users, adjusting the base price; and
    providing the particular user with an offer to repurchase the particular item of electronic content at the adjusted price,
    wherein said determining, said adjusting, and said providing are performed by one or more processors of a computer system.

2. The method of claim 1, wherein adjusting the base price further comprises:
    adjusting the base price upward based on determining that the particular user is more likely to repurchase the particular item of electronic content than the group of users; and
    adjusting the base price downward based on determining that the particular user is less likely to repurchase the particular item of electronic content than the group of users.

3. The method of claim 1, wherein adjusting the base price further comprises:
    determining an extent to which the particular user is more or less likely to repurchase the particular item of electronic content than the group of users; and
    adjusting the base price in correlation with the extent to which the particular user is more or less likely to repurchase the particular item of electronic content than the group of users.

4. The method of claim 1, wherein determining an aggregated likelihood that the group of users will repurchase the item of electronic content further comprises:
    determining a number of users in the group of users that have paid to consume the item of electronic content in the past;
    determining a number of users in the group of users that have also paid to repurchase the item of electronic content; and
    dividing the number of users in the group that have also paid to repurchase the item of electronic content by the number of users in the group that have paid to consume the item of electronic content.

5. The method of claim 1, wherein determining an aggregated likelihood that the group of users will repurchase the item of electronic content further comprises:
    estimating an aggregated likelihood that the group of users will repurchase the item of electronic content.

6. The method of claim 1, wherein determining that the particular user is more or less likely to repurchase the particular item of electronic content further comprises:
    determining information about the particular user;
    assigning the particular user to a segment of users based on the information;
    determining a likelihood of the segment of users to which the particular user is assigned to repurchase the particular item of electronic content; and
    comparing the likelihood of the segment of users to which the particular user is assigned, to the likelihood of the group of users.

7. The method of claim 6, wherein determining information about the particular user further comprises identifying a search term entered by the particular user.

8. The method of claim 6, wherein determining information about the particular user further comprises identifying a search result selected by the particular user.

9. The method of claim 6, wherein determining information about the particular user further comprises identifying one or more other items of electronic content that the particular user has consumed in the past.

10. The method of claim 6, wherein determining information about the particular user further comprises identifying one or more other items of electronic content that the particular user has purchased in the past.

11. The method of claim 6, wherein determining information about the particular user further comprises identifying one or more other items of electronic content in which the particular user has expressed interest.

12. The method of claim 1, further comprising:
determining a quantity of items of electronic content that the particular user has paid to repurchase during a predetermined period of time in the past;
wherein:
  determining an aggregated likelihood that the group of users will repurchase an item of electronic content further comprises determining an average quantity of items of electronic content that the group of users has paid to repurchase during the predetermined period of time in the past; and
  determining that the particular user is more or less likely to repurchase the particular item of electronic content than the group of users further comprises comparing the quantity of items of electronic content that the particular user has paid to repurchase, to the average quantity of items of electronic content that the group of users has paid to repurchase.

13. The method of claim 1, wherein the item of electronic content comprises an first audio or video recording, a first game, a first ringtone, a first mobile device application, or a first wallpaper, and
  wherein the particular item of electronic content comprises an second audio or video recording, a second game, a second ringtone, a second mobile device application, or a second wallpaper.

14. The method of claim 1, wherein determining an aggregated likelihood that a group of users will repurchase the item of electronic content further comprises determining an average likelihood that the group of users will repurchase the item of electronic content.

15. The method of claim 1, wherein determining an aggregated likelihood that a group of users will repurchase the item of electronic content further comprises determining a weighted average of the likelihood that each user in the group of users will repurchase an item of electronic content, wherein the weighted average is weighted according to a similarity between the group of users and the particular user.

16. The method of claim 1, wherein the group of users comprises users that exhibit similar demographic, purchase behavior, or consumption behavior characteristics to the particular user.

17. The method of claim 1, wherein the group of users is selected based on a social network behavior of the particular user.

18. The method of claim 1, wherein adjusting the base price further comprises:
  comparing the adjusted base price to a floor price or a ceiling price; and
  establishing the floor price or the ceiling price as the adjusted base price based on the comparison.

19. The method of claim 1, further comprising:
  determining a quantity of items of electronic content associated with the offer,
  wherein the base price associated with repurchasing the particular item of electronic content is further adjusted based on the quantity of items.

20. A system comprising:
one or more computers; and
a computer-readable storage medium coupled to the one or more computers having instructions stored thereon which, when executed by the one or more computers, cause the one or more computers to perform operations comprising:
  determining, for each user in a group of users, a likelihood of the respective user to repurchase an item of electronic content that the respective user has already purchased;
  determining an aggregated likelihood that the group of users will repurchase the item of electronic content;
  determining a base price associated with repurchasing a particular item of electronic content that has already been purchased;
  determining a portion of the particular item of electronic content that a particular user has consumed;
  determining, based upon the portion of the particular item of electronic content, that the particular user is more or less likely to repurchase the particular item of electronic content than the group of users;
  in response to determining that the particular user is more or less likely to repurchase the particular item of electronic content than the group of users, adjusting a base price associated with repurchasing the particular item of electronic content; and
  providing the particular user with an offer to repurchase the particular item of electronic content at the adjusted price.

21. The system of claim 20, wherein the group of users is selected based on a social network behavior of the particular user.

22. The system of claim 20, wherein determining that the particular user is more or less likely to repurchase the particular item of electronic content further comprises:
  determining information about the particular user;
  assigning the particular user to a segment of users based on the information;
  determining a likelihood of the segment of users to which the particular user is assigned to repurchase the particular item of electronic content; and
  comparing the likelihood of the segment of users to which the particular user is assigned, to the likelihood of the group of users.

23. The system of claim 20, wherein adjusting the base price further comprises:
  adjusting the base price upward based on determining that the particular user is more likely to repurchase the particular item of electronic content than the group of users; and
  adjusting the base price downward based on determining that the particular user is less likely to repurchase the particular item of electronic content than the group of users.

24. A computer storage medium encoded with a computer program, the program comprising instructions that when executed by one or more computers cause the one or more computers to perform operations comprising:
  determining, for each user in a group of users, a likelihood of the respective user to repurchase an item of electronic content that the respective user has already purchased;
  determining an aggregated likelihood that the group of users will repurchase the item of electronic content;

determining a base price associated with repurchasing a particular item of electronic content that has already been purchased;

determining a portion of the particular item of electronic content that a particular user has consumed;

determining, based upon the portion of the particular item of electronic content, that the particular user is more or less likely to repurchase the particular item of electronic content than the group of users;

in response to determining that the particular user is more or less likely to repurchase the particular item of electronic content than the group of users, adjusting a base price associated with repurchasing the particular item of electronic content; and providing the particular user with an offer to repurchase the particular item of electronic content at the adjusted price.

* * * * *